United States Patent
Jiang et al.

(10) Patent No.: US 11,453,731 B2
(45) Date of Patent: *Sep. 27, 2022

(54) CURABLE FLUOROCOPOLYMER FORMED FROM TETRAFLUOROPROPENE

(71) Applicant: HONEYWELL INTERNATIONAL INC., Morris Plains, NJ (US)

(72) Inventors: Wanchao Jiang, Shanghai (CN); Shijun Feng, Shanghai (CN); Siyuan Zhang, Shanghai (CN); Yun Lin, Shanghai (CN); Andrew J. Poss, Kenmore, NY (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 20 days.

This patent is subject to a terminal disclaimer.

(21) Appl. No.: 16/220,189

(22) Filed: Dec. 14, 2018

(65) Prior Publication Data
US 2019/0382513 A1 Dec. 19, 2019

Related U.S. Application Data

(63) Continuation of application No. 15/477,645, filed on Apr. 3, 2017, now Pat. No. 10,189,918, which is a continuation of application No. 14/463,747, filed on Aug. 20, 2014, now Pat. No. 9,624,325.

(60) Provisional application No. 61/894,146, filed on Oct. 22, 2013.

(51) Int. Cl.
*C08F 14/18* (2006.01)
*C08F 4/76* (2006.01)
*C08F 214/18* (2006.01)
*C09D 127/12* (2006.01)

(52) U.S. Cl.
CPC .......... *C08F 14/185* (2013.01); *C08F 4/76* (2013.01); *C08F 14/18* (2013.01); *C08F 214/18* (2013.01); *C08F 214/186* (2013.01); *C08F 214/188* (2013.01); *C09D 127/12* (2013.01)

(58) Field of Classification Search
CPC combination set(s) only.
See application file for complete search history.

(56) References Cited

U.S. PATENT DOCUMENTS

| | | |
|---|---|---|
| 3,674,758 A | 7/1972 | Carlson |
| 4,622,364 A | 11/1986 | Ohmori et al. |
| 4,701,508 A | 10/1987 | Homma et al. |
| 5,064,920 A | 11/1991 | Marumoto et al. |
| 5,082,911 A | 1/1992 | Kappler et al. |
| 5,098,972 A | 3/1992 | Kappler et al. |
| 5,142,011 A | 8/1992 | Shimizu et al. |
| 5,206,320 A | 4/1993 | Vara et al. |
| 5,258,447 A | 11/1993 | Koishi et al. |
| 5,304,617 A * | 4/1994 | Kodama .............. C09D 127/12 526/255 |
| 5,464,897 A | 11/1995 | Das et al. |
| 5,712,363 A | 1/1998 | Noomen et al. |
| 5,856,394 A * | 1/1999 | Hirashima ......... C08G 18/6279 524/544 |
| 6,124,510 A * | 9/2000 | Elsheikh ................. C07C 17/25 570/156 |
| 6,403,744 B1 | 6/2002 | Akama et al. |
| 6,689,423 B1 | 2/2004 | Schoonderwoerd et al. |
| 7,144,948 B2 | 12/2006 | Yamauchi et al. |
| 7,947,791 B2 | 5/2011 | Nomura et al. |
| 8,236,923 B2 | 8/2012 | Ito et al. |
| 9,290,595 B2 | 3/2016 | Kodama |
| 9,624,325 B2 | 4/2017 | Jiang et al. |
| 10,189,918 B2 * | 1/2019 | Jiang .................. C08F 214/188 |
| 10,435,580 B2 * | 10/2019 | Duan .................. C08F 214/188 |
| 2003/0113466 A1 | 6/2003 | Frazzitta et al. |
| 2003/0153703 A1 | 8/2003 | Funaki et al. |
| 2004/0019145 A1 | 1/2004 | Imoto et al. |
| 2004/0026053 A1 | 2/2004 | Tembou N'Zudie et al. |
| 2004/0214017 A1 | 10/2004 | Uhlianuk et al. |
| 2005/0245773 A1 * | 11/2005 | Mukhopadhyay ...... C07C 17/00 570/155 |

(Continued)

FOREIGN PATENT DOCUMENTS

| | | |
|---|---|---|
| CN | 101104663 | 1/2008 |
| CN | 104892811 | 9/2015 |

(Continued)

OTHER PUBLICATIONS

Kotora et al., "Addition of Tetrachloromethane to Halogenated Ethenes Catalyzed by Transition Metal Complexes," Journal of Molecular Catalysis, vol. 77, pp. 51-60 (1992).

Sridhar et al., "Synthesis and Diels-Alder Cycloaddition Reactions of [(2,2-Dichloro-1-fluoroethenyl)sulfinyl] Benzene and [(2-Chloro-1,2-difluoro ethenyl sulfinyl] Benzene," Tetrahedron, vol. 56, pp. 3539-3545 (2000).

EIC search of CAS from U.S. Appl. No. 15/353,676, pp. 1-196 (Aug. 17, 2018).

*Primary Examiner* — Nicole M. Buie-Hatcher

(74) *Attorney, Agent, or Firm* — Roberts & Roberts, LLP; Richard S. Roberts, Jr.

(57) ABSTRACT

The present invention is directed to partially fluorinated copolymers and the production thereof. More specifically, the copolymers, which are preferably produced by a solution polymerization process, preferably have at least three units, the first unit selected from 2,3,3,3-tetrafluoropropene and 1,3,3,3-tetrafluoropropene, the second unit having a polymerized monomer selected from the vinyl esters and vinyl ethers, and the third unit having a polymerized monomer derived from a hydroxyl group-containing vinyl ether. The resulting copolymer is environmentally friendly, has favorable molecular weight characteristics, and may be shipped economically in high concentration.

16 Claims, No Drawings

(56) References Cited

U.S. PATENT DOCUMENTS

| | | |
|---|---|---|
| 2007/0049752 A1 | 3/2007 | Drysdale |
| 2008/0103237 A1 | 5/2008 | Strepka et al. |
| 2008/0153977 A1 | 6/2008 | Samuels et al. |
| 2008/0153978 A1 | 6/2008 | Samuels et al. |
| 2008/0171844 A1 | 7/2008 | Samuels et al. |
| 2009/0043062 A1* | 2/2009 | Masuda ............ C08G 18/6279 526/249 |
| 2009/0048391 A1* | 2/2009 | Sumi .................... C08F 214/18 524/545 |
| 2009/0118554 A1* | 5/2009 | Rao ....................... B01J 23/868 570/156 |
| 2009/0186986 A1* | 7/2009 | Nomura ............... C08F 214/18 525/326.3 |
| 2009/0239993 A1 | 9/2009 | Sumi et al. |
| 2010/0179285 A1 | 7/2010 | Watanabe et al. |
| 2011/0097529 A1 | 4/2011 | Durali et al. |
| 2011/0184116 A1 | 7/2011 | Kimura et al. |
| 2011/0260945 A1 | 10/2011 | Karasawa |
| 2012/0108753 A1 | 5/2012 | Takemura et al. |
| 2012/0184653 A1 | 7/2012 | Wang et al. |
| 2012/0184697 A1 | 7/2012 | Samuels et al. |
| 2012/0208007 A1 | 8/2012 | Mukhopadhyay et al. |
| 2013/0023636 A1 | 1/2013 | Imahori et al. |
| 2013/0089671 A1 | 4/2013 | Nalewajek et al. |
| 2013/0090439 A1 | 4/2013 | Lu et al. |
| 2013/0203950 A1 | 8/2013 | Imahori et al. |
| 2013/0211155 A1* | 8/2013 | Nair ..................... C07C 17/206 570/157 |
| 2013/0245183 A1 | 9/2013 | Beaudry et al. |
| 2013/0345381 A1 | 12/2013 | Amin-Sanayei et al. |
| 2014/0018492 A1 | 1/2014 | Imahori et al. |
| 2014/0080987 A1 | 3/2014 | Feng et al. |
| 2014/0087195 A1 | 3/2014 | Rainal et al. |
| 2014/0147480 A1 | 5/2014 | Lu et al. |
| 2014/0252332 A1 | 9/2014 | Carroll |
| 2014/0339167 A1 | 11/2014 | Lu et al. |
| 2015/0112015 A1 | 4/2015 | Jiang et al. |
| 2015/0299498 A1 | 10/2015 | Schwartz et al. |
| 2016/0168389 A1 | 6/2016 | Oya et al. |
| 2017/0145132 A1 | 5/2017 | Xu et al. |
| 2017/0247562 A1 | 8/2017 | Jiang et al. |
| 2017/0322488 A1 | 11/2017 | Obi et al. |
| 2018/0112019 A1 | 4/2018 | Lin et al. |

FOREIGN PATENT DOCUMENTS

| | | | |
|---|---|---|---|
| CN | 104945549 | 9/2015 | |
| EP | 0508229 | 10/1992 | |
| GB | 2081727 | 2/1982 | |
| JP | S61-275311 | 12/1986 | |
| JP | 62-104862 | 5/1987 | |
| JP | H03-146177 | 6/1991 | |
| JP | H04-18473 | 1/1992 | |
| JP | H09-010672 | 1/1997 | |
| JP | 2966480 | 10/1999 | |
| JP | 2008-255328 | 10/2008 | |
| JP | 5212561 B1 * | 6/2013 | ........... C09D 127/18 |
| WO | 8912240 | 12/1989 | |
| WO | 2008079879 | 7/2008 | |
| WO | 2008079886 | 7/2008 | |
| WO | 2008079986 | 7/2008 | |
| WO | 2009011694 | 1/2009 | |
| WO | 2012147569 | 11/2012 | |
| WO | 2011126056 | 7/2013 | |
| WO | 2014026780 | 2/2014 | |
| WO | 2015060970 | 4/2015 | |
| WO | 2015137286 | 9/2015 | |
| WO | 2016040525 | 3/2016 | |
| WO | 2016094121 | 6/2016 | |

* cited by examiner

CURABLE FLUOROCOPOLYMER FORMED FROM TETRAFLUOROPROPENE

CROSS-REFERENCE TO RELATED APPLICATIONS

The present application is a continuation of U.S. application Ser. No. 15/477,645, filed Apr. 3, 2017, which is a continuation of U.S. application Ser. No. 14/463,747, filed Aug. 20, 2016, which claims priority from U.S. Provisional Application Ser. No. 61/894,146, filed 22 Oct. 2013, the disclosure of which is hereby incorporated herein by reference. The '146 Provisional Application is related to U.S. application Ser. No. 13/645,444, filed on Oct. 4, 2012, U.S. application Ser. No. 13/645,437, filed on Oct. 4, 2012, U.S. Provisional Application No. 61/543,780, filed on Oct. 5, 2011, and U.S. Provisional Application No. 61/543,714, filed on Oct. 5, 2011, the contents of which are hereby incorporated herein by reference in their entirety.

FIELD OF THE INVENTION

The present invention generally relates to novel curable copolymers formed, at least in part, from tetrafluoropropene. More specifically, the present invention relates to curable copolymers formed in part from monomeric material comprising 2,3,3,3-tetrafluoropropene ($CF_3CF=CH_2$, "HFO-1234yf") and/or 1,3,3,3-tetrafluoropropene ($CH_2=CFCF_3$, "HFO-1234ze"), and to compositions and uses thereof.

BACKGROUND OF THE INVENTION

Fluoropolymers such as polytetrafluoroethylene (PTFE), polychlorotrifluoroethylene (PCTFE) and polyvinylidene fluoride (PVDF) are well known for having excellent thermal, chemical, and weather resistance, along with favorable properties like water and oil resistance. Unfortunately, the use of such fluoropolymers in coatings is difficult owing to their poor solubility in industrial solvents—such as xylene and butyl acetate—which are typically used in the coating industry. Instead, more exotic solvents must often be used, which not only affect the economics of a coating, but can also present environmental issues owing to, e.g., potential toxicity of the exotic solvents.

Accordingly, there is a need to formulate alternative coatings which have superior performance properties, yet can use economical industrial solvents and be environmentally friendly.

Furthermore, polymerization of fluorinated polymers presents a number of challenges, e.g., as detailed in prior application Ser. No. 13/645,437 (now U.S. Patent Publication No. 2013/0090439 A1), incorporated herein by reference. Although several types of polymerization methods to make tetrafluoropropene copolymers have been described in prior application Ser. No. 13/645,437, Applicants have come to further appreciate that these polymerization methods have undesirable aspects or limitations, and/or that the polymers produced thereby can be formed with different and/or improved properties.

Accordingly, Applicants have come to appreciate a need to develop improved processes for making tetrafluoropropene copolymers having different and/or improved properties for uses in various applications.

SUMMARY OF THE INVENTION

In accordance with a first aspect of the present invention, a curable fluorocopolymer can be formed by solution copolymerization of the monomers represented by (a), (b) and (c):

(a) 40 to 60 mol % of tetrafluoropropene;
(b) 5 to 45% of vinyl ether or vinyl ester or both of them, represented by formula $CH_2=CR1—O(C=O)_xR2$ and $CH_2=CR3—OR4$ respectively, wherein R1 and R3 is hydrogen or a methyl group, and wherein R2 and R4 is an unsubstituted straight-chain, branched-chain or alicyclic alkyl group having 1 to 12 carbon atoms; and
(c) 3 to 30 mol % of hydroxyalkyl vinyl ether, represented by formula $CH_2=C—R5—OR6$, wherein R5 is hydrogen or a methyl group, and R6 is an unsubstituted straight-chain, branched-chain or alicyclic alkyl group having a hydroxyl groups.

In accordance with a second aspect of the present invention, the tetrafluoropropene is selected from either or both of HFO-1234yf and HFO-1234ze. In accordance with the present invention, the applicants have found that environmentally friendly HFO-1234yf and HFO-1234ze can each, and in combination, be employed advantageously as fluorinated monomers for the production of polymeric coatings.

In accordance with a third aspect of the present invention, a product containing the curable fluorocopolymer has a solvent content of 15-50%, and preferably, 15-25%, so as to provide a concentrated product which is economical to ship to the user of the product.

DETAILED DESCRIPTION OF THE INVENTION

In accordance with a preferred embodiment of the present invention, the 40-60 mol % tetrafluoropropene in the form of HFO-1234yf and/or HFO-1234ze is used as component (a), and most preferably, 45 to 55 mol %. If a mixture of HFO-1234yf and HFO-1234ze is used, the blending ratio of HFO-1234yf and HFO-1234ze is used can be any ratio, but preferably is 0.3 to 0.7: 0.7 to 0.3.

A copolymer in accordance with the present invention may contain vinyl ether units, vinyl ester units, or a combination thereof as component (b). Preferably, 5 to 45 mol% is used, and most preferably, 25-45 mol% is used. Examples of vinyl ether include alkyl vinyl ethers such as methyl vinyl ether, ethyl, propyl vinyl ether, n-butyl vinyl ether, isobutyl vinyl ether, hexyl vinyl ether, octyl vinyl ether, decyl vinyl ether and lauryl vinyl ether. Vinyl ethers including an alicyclic group can also be used, for example, cyclobutyl vinyl ether, cyclopentyl vinyl ether and cyclohexyl vinyl ether. Examples of vinyl esters include vinyl acetate, vinyl propionate, vinyl butyrate, vinyl pivalate, vinyl capronate, vinyl laurate, VEOVA-9 (vinyl versatate ester formed from a C9 carboxylic acid, produced by Momentive), VEOVA-10 (vinyl versatate ester formed from a C10 carboxylic acid, produced by Momentive) and vinyl cyclohexanecarboxylate.

Examples of the hydroxyalkyl vinyl ether of component (c) include hydroxyethyl vinyl ether, hydroxypropyl vinyl ether, hydroxybutyl vinyl ether, hydroxypentyl vinyl ether and hydroxyhexyl vinyl ether. Preferably 3 to 30 mol % is used, and most preferably, 5 to 20 mol % is used.

The fluorocopolymer is preferably produced in a solution polymerization system. Examples of solvents for solution polymerization include: esters, such as methyl acetate, ethyl acetate, propyl acetate and butyl acetate; ketones, such as acetone, methyl ethyl acetone and cyclohexanone; aliphatic hydrocarbons, such as hexane, cyclohexane, octane, nonane, decane, undecane, dodecane and mineral spirits; aromatic hydrocarbons, such as benzene, toluene, xylene, naphthalene, and solvent naptha; alcohols, such as methanol, ethanol, tert-butanol, iso-propanol, ethylene glycol monoalkyl ethers; cyclic ethers, such as tetrahydrofuran, tetrahydropyran, and dioxane; fluorinated solvents, such as HCFC-225 and HCFC-141b; dimethyl sulfoxide; and the mixtures thereof.

Preferably, polymerization is conducted in a range of −30° C. to 150° C. depending on the polymerization initiation source and type of the polymerization medium.

The copolymer of the present invention is preferably prepared by copolymerizing those monomers and having a number average molecular weight of 5000 to 50000, and more preferably 5000 to 10000. Preferably, the copolymer has a molecular weight distribution of 2 to 10, more preferably 2.5 to 8, and most preferably 3 to 6. When the number average molecular weight is less than 5000, the copolymer is inferior in weatherability and chemical resistance, and when more than 50000, high viscosities may cause operational difficulties.

The copolymer of the present invention has hydroxyl groups and it is curable with a curing agent such as melamine resin curing agent, urea resin curing agent, polybasic acid curing agent and a non-blocked polyisocyanate curing agent or a blocked polyisocyanate curing agent which are used for conventional thermosetting acryl coating. Examples of melamine resin curing agents include butylated melamine resin, methylated melamine resin, epoxymelamine resin and the like. Examples of non-blocked polyisocyanate include 2,4- and 2,6-diisocyanatotoluene (TDI), diphenylmethane-2,4'-and/or -4,4'-diisocyanate (MDI), 1,6-hexamethylene diisocyanate (HDI), 1-isocyanato-3,3,5-trimethyl-5-isocyanatomethylcyclohexane (IPDI), dicyclohexylmethane diisocyanate (H12MDI), 1,4-diisocyanatobutane, 2-methyl-1,5-diisocyanatopentane, 1,5-diisocyanato-2,2-dimethylpentane, 2,2,4- or 2,4,4-trimethyl-1,6-diisocyanatohexane, 1,10-diisocyanato-decane, 1,3- and 1,4-diisocyanatocyclohexane, 1,3- and 1,4-bis-(isocyanatomethyl)-cyclohexane, 4,4'-diisocyanatodicyclohexylmethane, 1-isocyanato-1-methyl-4(3)-isocyanato-methylcyclohexane (IMCI), bis-(isocyanatomethyl)-norbornane, 1,3- and 1,4-bis-(2-isocyanato-prop-2-yl)-benzene (TMXDI), 1,5-diisocyanato-naphthalene, 2,4'-, 4,4'-diisocyanatodiphenylmethane, and their dimers, trimers and polymers thereof. As to blocked polyisocyanate, preferred blocking groups employed for blocking polyisocyanates include metal bisulfite, diethyl malonate (DEM) 3,5-dimethylpyrazole (DMP), methyl-ethylketoxime (MEKO) e-caprolactam (e-CAP), diisopropylamine, dimethyl-pyrazole, methyl ethyl ketoxime (butanone oxime), malonic acid diethyl ester, secondary amines and triazole and pyrazole derivatives. When the curing is conducted at an ordinary temperature by using polyisocyanate, it is possible to accelerate the curing by an addition of a conventional catalyst such as dibutyltin dilaurate Various solvents can be used for the preparation of solution-type paints or coatings with the copolymer of the present invention. Preferred solvents include aromatic hydrocarbons such as xylene and toluene; alcohols such as n-butanol; esters such as butyl acetate; ketones such as methyl isobutyl ketone, and glycol ethers such as ethyl cellusolve and various commercial thinners. When the copolymer of the present invention is used for producing a thermosetting composition for coating, a curing agent such as a melamine type curing agent, a urea type curing agent, a polybasic acid type curing agent, a polyisocyanate type curing agent or the like is simultaneously mixed in the mixing step mentioned above to produce a one-pack type coating.

On the other hand, when the composition is a normal temperature setting type coating which uses a polyisocyanate, the curing agent component is separately prepared to provide a two-pack type coating. In this case, the coating can be cured at room temperature for from several hours to several days, and has good properties by controlling the type of isocyanate and catalyst and their amounts to be added, the concentration of the copolymer, the contents of the hydroxyalkyl vinyl ether in the copolymer, and the like.

When the copolymer of the present invention is used as resin for paint or coating, it is possible to form under a mild condition, a film having excellent hardness of finish and gloss, flexibility, chemical resistance, stain resistance and weathering resistance. Such films are useful not only as a coating for pre-coated galvanized steel, colored aluminum plate and aluminum frames, but also as an on-site paintable non-thermally dryable paint. The paint or coating may be used for a number of substrates, including: metallic substrates; inorganic substrates such as glass, cement and concrete; organic substrates, for example, plastics (such as polyethylene, polypropylene, ethylene-vinyl acetate copolymer, nylon, acryl polyester ethylene-polyvinyl alcohol copolymer, vinyl chloride, vinylidene chloride) and wood materials. Specific applications for the paint or coating include, but are not limited to, the coating of aluminum swimming pools, the coating of colored glass intended for exterior use, and the coating of cement tile used for roofing.

The present invention is further illustrated by the following non-limiting examples.

EXAMPLE 1

19.0 g of butyl acetate, 9.5 g of ethyl vinyl ether, 20.8 g of VEOVA-9, 8.0 g of hydroxybutyl vinyl ether, and 0.62 g of tert-butyl peroxypivalate were charged into a 300 ml stainless steel autoclave equipped with a stirrer. The mixture was solidified with liquid nitrogen, and deaerated to remove the dissolved air. Then, 50 g of 1,3,3,3-tetrafluoropropene was added to the mixture, and the mixture was gradually heated to 65° C. in an autoclave. The mixture was stirred for 18 hours. After the autoclave was cooled to room temperature, the unreacted monomers were purged and the autoclave was opened. Excess solvent was removed via evaporation.

Yield 92%; Tg (glass transition temperature) of final copolymer=15° C.; Mn=7348; Mw=13789; Mw/Mn=1.87; final polymer concentration=74.7%; viscosity<500 cps.

EXAMPLE 2

20.0 g of butyl acetate, 9.1 g of ethyl vinyl ether, 6.0 g of vinyl acetate, 6.7 g of hydroxybutyl vinyl ether, and 0.4 g. of tert-Butyl peroxypivalate were charged into a 300 ml stainless steel autoclave equipped with a stirrer. The mixture was solidified with liquid nitrogen, and deaerated to remove the dissolved air. Then, 40 g of 2,3,3,3-tetrafluoropropene was added to the mixture, and the mixture was gradually heated to 65° C. in an autoclave. The mixture was stirred for 18 hours. After the autoclave was cooled to room temperature, the unreacted monomers were purged and the autoclave was opened. Excess solvent was removed via evaporation.

Yield 91%; Tg of final copolymer=11° C.; Mn=5314; Mw=12646; Mw/Mn=2.38; final polymer concentration=73.8%; viscosity<600 cps.

EXAMPLE 3

20.0 g of butyl acetate, 8.0 g of ethyl vinyl ether, 17.4 g of VEOVA-9, 6.7 g. of hydroxybutyl vinyl ether, and 0.63 g. of tert-butyl peroxypivalate were charged into a 300 ml stainless steel autoclave equipped with a stirrer. The mixture was solidified with liquid nitrogen, and deaerated to remove the dissolved air. Then, 60 g of 1,3,3,3-tetrafluoropropene was added to the mixture, and the mixture was gradually heated to 65° C. in an autoclave. The mixture was stirred for 18 hours. After the autoclave was cooled to room temperature, the unreacted monomers were purged and the autoclave was opened. Excess solvent was removed via evaporation.

Yield 93%; Tg of final copolymer=32° C.; Mn=7136; Mw=24103; Mw/Mn=3.37; final polymer concentration=81.1%; viscosity<700 cps.

EXAMPLE 4

20.0 g of butyl acetate, 8.2 g of ethyl vinyl ether, 22.3 g of VEOVA-9, 3.4 g of hydroxybutyl vinyl ether, and 0.66 g of tert-butyl peroxypivalate were charged into a 300 ml stainless steel autoclave equipped with a stirrer. The mixture was solidified with liquid nitrogen, and deaerated to remove the dissolved air. Then, 50 g. of 1,3,3,3-tetrafluoropropene was added to the mixture, and the mixture was gradually heated to 65° C. in an autoclave. The mixture was stirred for 18 hours. After the autoclave was cooled to room temperature, the unreacted monomers were purged and the autoclave was opened. Excess solvent was removed via evaporation.

Yield 85%; Tg of final copolymer=12° C.; Mn=4640; Mw=8079; Mw/Mn=1.74; final polymer concentration=78.1%; viscosity<600 cps.

EXAMPLE 5

30.0 g of butyl acetate, 7.6 g of ethyl vinyl ether, 18.4 g of VeoVa-9, 6.7 g of hydroxybutyl vinyl ether, and 0.60 g of tert-butyl peroxypivalate were charged into a 300 ml stainless steel autoclave equipped with a stirrer. The mixture was solidified with liquid nitrogen, and deaerated to remove the dissolved air. Then, 60 g of 1,3,3,3-tetrafluoropropene was added to the mixture, and the mixture was gradually heated to 65° C. in an autoclave. The mixture was stirred for 18 hours. After the autoclave was cooled to room temperature, the unreacted monomers were purged and the autoclave was opened. Excess solvent was removed via evaporation.

Yield 82%; Tg of final copolymer=22° C.; Mn=7640; Mw=17620; Mw/Mn=2.31; final polymer concentration=71.7%; viscosity<600 cps.

APPLICATION EXAMPLE 26.1 g of the resulting copolymer was dissolved in 17.9 g of butyl acetate, and then blended with 22.3 g of titanium oxide. The mixture was mixed for 1 hour by a paint shaker, then subsequently mixed with 14.8 g of DESMODUR BL4265, and 0.3 g of dibutyl tin dilaurate (1% concentration). The mixture was then used to coat an aluminum substrate. About 72 hours later, the physical properties of the surface were tested.

The gloss (ISO 2813) of the surface=70(20° C.); Hardness (Pencil Test; ASTM D3363)=3H; Flexibility (ASTM D4145)=3T; Adhesion (ASTM D3359)=5B.

From the foregoing, it will be appreciated that although specific examples have been described herein for purposes of illustration, various modifications may be made without deviating from the spirit or scope of this disclosure. It is therefore intended that the foregoing detailed description be regarded as illustrative rather than limiting, and that it be understood that it is the following claims, including all equivalents, that are intended to particularly point out and distinctly claim the claimed subject matter.

What is claimed is:

1. A copolymer composition comprising a copolymer and a solvent or solvents, wherein said copolymer consists of:
    (a) from 40 mol % to 60 mol % of polymerized monomers of 1,3,3,3-tetrafluoropropene;
    (b) from 5 mol % to 45 mol % of polymerized monomers of vinyl ester(s) or vinyl ether(s); and
    (c) from 3 mol % to 30 mol % of polymerized monomers of hydroxyl group-containing vinyl ether(s);
    wherein said solvent or solvents comprise from 15-50 wt % of said copolymer composition.

2. The copolymer composition of claim 1 wherein said composition comprises at least 70 wt. % of said copolymer.

3. The copolymer composition of claim 1 wherein said copolymer has hydroxyl groups.

4. The copolymer composition of claim 3, wherein said hydroxyl group-containing vinyl ether(s) is a compound of formula $CH_2=CR^5-OR^6$, wherein $R^5$ is hydrogen or a methyl group, and $R^6$ is an unsubstituted straight-chain, branched-chain or alicyclic alkyl group having a hydroxyl groups.

5. The copolymer composition of claim 4, wherein said hydroxyl group-containing vinyl ether is hydroxyalkyl vinyl ether.

6. The copolymer composition of claim 1, wherein the copolymer comprises a vinyl ester and wherein said vinyl ester is a compound of formula $CH_2=CR^1-O(C=O)R^2$, wherein $R^1$ is hydrogen or a methyl group, and wherein $R^2$ is an unsubstituted straight-chain, branched-chain or alicyclic alkyl group having 1 to 12 carbon atoms.

7. The copolymer composition of claim 6, wherein said vinyl ester is a vinyl versatate ester formed from a $C_9$ carboxylic acid or a vinyl versatate ester formed from a $C_{10}$ carboxylic acid.

8. The copolymer composition of claim 1, wherein said copolymer consists of said polymerized 1,3,3,3-tetrafluoropropene, vinyl esters and hydroxyl group-containing vinyl ether(s).

9. The copolymer composition of claim 1, wherein the copolymer has a number average molecular weight of between 5000 and 50000.

10. The copolymer composition of claim 1, wherein the copolymer has a number average molecular weight of between 5000 and 10000.

11. The copolymer composition of claim 1 wherein the copolymer comprises from 45 mol % to 55 mol % of said polymerized monomers of 1,3,3,3-tetrafluoropropene; from 25 mol % to 45 mol % of said polymerized monomers of vinyl esters or vinyl ethers; and from 5 mol % to 20 mol % of said polymerized monomers of hydroxyl group-containing vinyl ether(s).

12. The copolymer composition of claim 1, wherein said copolymer consists of said polymerized 1,3,3,3-tetrafluoropropene, ethyl vinyl ether, and hydroxyl butyl vinyl ether.

13. The copolymer composition of claim 1, wherein said copolymer consists of said polymerized 1,3,3,3-tetrafluoropropene, a vinyl versatate ester formed from a $C_{10}$ carboxylic acid and hydroxyl butyl vinyl ether.

14. The copolymer composition of claim 1, wherein the component (b) is the vinyl ether and wherein said vinyl ether is a compound of formula $CH_2=CR^3-OR^4$ wherein $R^3$ is hydrogen or a methyl group, and wherein $R^4$ is an unsubstituted straight-chain, branched-chain or alicyclic alkyl group having 1 to 12 carbon atoms.

15. The copolymer composition of claim 1, wherein said copolymer consists of said polymerized 1,3,3,3-tetrafluoropropene, vinyl ethers and hydroxyl group-containing vinyl ether(s).

16. The copolymer composition of claim 1, wherein the composition comprises 15-25 wt % solvent.

* * * * *